US007704573B2

(12) United States Patent
Itami et al.

(10) Patent No.: US 7,704,573 B2
(45) Date of Patent: Apr. 27, 2010

(54) POROUS MEMBRANE AND RECORDING MEDIUM COMPRISING SAME

(75) Inventors: Yujiro Itami, Tilburg (NL); Iskandar Gandasasmita, Tilburg (NL); Akira Kase, Tilburg (NL)

(73) Assignee: FUJIFILM Manufacturing Europe B.V. (NL)

( * ) Notice: Subject to any disclaimer, the term of this patent is extended or adjusted under 35 U.S.C. 154(b) by 12 days.

(21) Appl. No.: 12/020,937

(22) Filed: Jan. 28, 2008

(65) Prior Publication Data

US 2008/0182044 A1 Jul. 31, 2008

Related U.S. Application Data

(63) Continuation of application No. PCT/NL2006/000403, filed on Aug. 4, 2006.

(30) Foreign Application Priority Data

Aug. 5, 2005 (EP) ................................. 05076825

(51) Int. Cl.
*B41M 5/40* (2006.01)

(52) U.S. Cl. .............. 428/32.18; 428/32.21; 428/32.24; 428/158; 428/304.4; 428/306.6; 428/316.6; 427/243

(58) Field of Classification Search .............. 428/32.18, 428/32.21, 32.24, 304.4, 306.6, 316.6, 158; 427/243
See application file for complete search history.

(56) References Cited

U.S. PATENT DOCUMENTS

| | | | |
|---|---|---|---|
| 3,823,027 A | 7/1974 | Wismer et al. | |
| 4,466,931 A | 8/1984 | Tanny | |
| 4,707,265 A | 11/1987 | Barnes, Jr. et al. | |
| 4,781,905 A | 11/1988 | Yu-Ming et al. | |
| 4,942,204 A | 7/1990 | Kennedy | |
| 5,079,272 A | 1/1992 | Allegrezza, Jr. et al. | |
| 5,084,340 A | 1/1992 | Light | |
| 5,236,588 A * | 8/1993 | Zhang et al. | 210/500.35 |
| 6,210,808 B1 | 4/2001 | Naisby | |
| 6,534,123 B1 * | 3/2003 | Mukherjee et al. | 427/245 |
| 6,734,514 B2 | 5/2004 | Robert et al. | |
| 6,750,261 B1 * | 6/2004 | Clear et al. | 521/50.5 |
| 2004/0229966 A1 * | 11/2004 | Dontula et al. | 521/50 |

FOREIGN PATENT DOCUMENTS

| | | |
|---|---|---|
| EP | 0 216 622 | 4/1987 |
| EP | 0 251 511 | 6/1987 |
| EP | 0 481 517 | 4/1992 |
| EP | 0 738 608 | 10/1996 |
| EP | 0 803 533 | 4/1997 |
| EP | 0 812 697 | 12/1997 |
| EP | 0 824 959 | 2/1998 |
| EP | 0 888 903 | 1/1999 |
| EP | 0 889 080 | 1/1999 |
| EP | 1 149 624 | 10/2001 |
| EP | 1 176 030 | 1/2002 |
| EP | 1 273 599 | 1/2003 |
| EP | 1 289 767 | 10/2003 |
| EP | 1 418 058 | 11/2003 |
| EP | 1 477 318 | 1/2004 |
| EP | 1 419 984 | 5/2004 |
| EP | 1 437 229 | 7/2004 |
| FR | 2 687 589 | 8/1993 |
| GB | 1 549 352 | 8/1979 |
| GB | 2 088 777 | 6/1982 |
| GB | 2 182 046 | 5/1987 |
| JP | 2 107 649 | 4/1990 |
| JP | 5 177 120 | 7/1993 |
| WO | WO 93/25300 | 12/1993 |
| WO | WO 98/32541 | 7/1998 |
| WO | WO 99/21723 | 5/1999 |
| WO | WO 01/88025 | 11/2001 |
| WO | WO 01/91999 | 12/2001 |
| WO | WO 02/055618 | 7/2002 |
| WO | WO 2004/022201 | 3/2004 |
| WO | WO 2005/016655 | 2/2005 |
| WO | WO 2005/032832 | 4/2005 |
| WO | WO 2005/032834 | 4/2005 |
| WO | WO 2006/011800 | 2/2006 |

OTHER PUBLICATIONS

*Ullmann's Encyclopedia of Industrial Chemistry*, vol. A18, pp. 153-167 (1991).
RD 8407 "Optical brightening compositions" 14 pages (1971).
RD 8727 "Photographic developer composition" 8 pages (1971).
RD 9310 "Fluorescent whitening agents" 5 pages (1972).
RD 11125 "Bisbenzoxazolylthiopehen optical brighteners" 7 pages (1973).
RD 30362, "UV protective layers for use in photographic materials," Research Disclosure Jul. 1989.
RD 30805, "New uses of light stabilizers in colour imaging," Research Disclosure Dec. 1989.
RD 31980, "Stabilisers for photographic and hard copy materials," Research Disclosure Nov. 1990.
RD 36544, "Photographic silver halide emulsions, preparations, addenda, systems and processing" (1994).
English abstract of EP 0 812 697.
English abstract of EP 0 888 903.
English abstract of EP 1 419 984.
English abstract of FR 2 687 589.
English abstract of JP 2 107 649.
English abstract of JP 5 177 120.

* cited by examiner

*Primary Examiner*—Betelhem Shewareged

(57) ABSTRACT

The present invention relates to a porous membrane comprising multiple layers, at least one type of curable compound and at least two types of photo-initiator, wherein at least two layers each contain a the different photo-initiator. The invention further relates to recording media which comprise the porous membrane of the invention, as well as to processes for producing the membrane and the recording media.

14 Claims, No Drawings

POROUS MEMBRANE AND RECORDING MEDIUM COMPRISING SAME

RELATED APPLICATIONS

This application claims priority from International application number PCT/NL2006/000403, filed 4 Aug. 2006; which claims priority from European application number EP 05076835.7, filed 5 Aug. 2005; each of which is hereby incorporated herein by reference in its entirety for all purposes.

FIELD

The present invention relates to porous membranes obtained by curing compounds through radiation. The invention further relates to image recording materials in which these porous membranes are used, in particular as an ink-receiving layer. The invention also relates to processes for preparing said membranes and said recording media, as well as to the use of said membranes and said recording media.

BACKGROUND

Several examples can be found in which curable mixtures are used to produce inkjet recording media. EP-A-1 289 767, EP-A-1 418 058 and EP-A-1 477 318 disclose layers, cured by UV or other radiation in which the porous character is provided by organic or inorganic particles in order to obtain sufficient solvent uptake. However, application of inorganic particles can cause physical weakness of the layer, resulting in cracking or breaking of the layer.

EP-A-0 738 608 describes curing compositions containing a water soluble high-molecular weight compound, but these compositions yield solid layers and therefore do not dry quickly.

WO-A-99/21723 discloses a substrate coated with a binder dissolved in an aqueous solvent mixture, which layer is then cured, and teaches that any amount of solvent is suitable, and there is no limit to the degree in which the binder is diluted before curing.

WO-A-01/91999 and GB-A-2 182 046 disclose a curable inkjet coating that is cured after drying the coating.

U.S. Pat. No. 6,210,808 describes an inkjet recording sheet wherein a colloidal suspension of water-insoluble particles and water-insoluble monomers/prepolymers is cured.

U.S. Pat. No. 6,734,514 discloses a radiation curable coating for ink jet printing comprising water insoluble latexes.

Another method is the application of foamed layers as in for example EP-A-0 888 903.

In the above mentioned prior art the receiving layer is not isolated, but formed directly on the substrate after drying and/or further manipulation of the coated substrate. It would be advantageous, to be able to isolate such a layer as a membrane which can be used as such or which can be applied to a substrate in a separate process to give advantageous properties, for instance as an inkjet receiving medium. Membranes are produced by various methods such as dry and wet phase inversion of polymeric solutions, stretching of homogeneous, partially crystalline polymer films, sintering of particulate materials, thermal gelation of homogeneous polymer solutions and by radical polymerization with simultaneous phase separation by irradiation or thermal initiation. Of these methods the wet phase inversion method—in which a polymer solution is contacted with a precipitating agent or non-solvent causing separation into a solid polymer-rich phase and a liquid solvent-rich phase—is by far the most widely used technique for obtaining porous structures. Examples in which this technique is applied can be found in WO-A-98/32541, WO-A-2005/016655, U.S. Pat. No. 4,707,265, U.S. Pat. No. 6,079,272, EP-A-0 803 533, EP-A-0 812 697, EP-A-0 824 959, EP-A-0 889 080 and EP-A-1 149 624.

The main disadvantages of wet phase inversion are the limited production speed obtainable and the high amounts of organic solvents required.

Dry phase inversion processes are described e.g. in EP-A-1 176 030. An alternative method is disclosed in U.S. Pat. No. 4,466,931, EP-A-0 216 622 and EP-A-0 481 517 describing a membrane which is produced by irradiating curable monomers in non-volatile organic solvents which are to be removed by washing with a washing liquid of low boiling point.

As many curable compounds are hydrophobic in nature both dry and wet phase inversion techniques require organic apolar solvents to obtain a clear solution. Since these membranes are often not hydrophilic an additional process step may be required to make the membrane hydrophilic for instance by impregnating the membrane with a saline solution as is described in e.g. FR-A-2 687 589, with molecules that comprise hydrophilic and hydrophobic groups as is described in e.g. WO2004/022201 or with a solution of a cationic or anionic polymer as is described in e.g. JP-A-2 107 649.

Membranes can also be made by other methods such as thermal polymerization as described in e.g. EP-A-0 251 511, JP-A-5 177 120 and U.S. Pat. No. 4,942,204 or grafting acrylic acid to PVC films as described in GB-A-1 549 352 but these membranes or films are not porous and are not formed by phase separation from a solvent.

Membranes made from amphiphilic copolymers as free standing films are described in WO-A-01/88025 which are also not porous and of relatively small size (up to 1 mm$^2$).

Although under certain conditions acceptable results can be obtained with the above-mentioned prior art materials, there is still a need for improvement. The present invention seeks to fulfill, at least in part, this need.

For recording media improvement is required in particular with respect to smearing properties, which may be associated with absorption properties of the porous film, in particular absorption speed. At the same time a porous film must be provided that has a good gloss.

There is a need for a membrane that can be produced at high speeds without requiring costly measures to guarantee safety and to prevent pollution of the environment. This invention aims at solving these problems, at least in part.

DETAILED DESCRIPTION

It is an object of this invention to provide a porous membrane that can be produced at low cost and at high coating speeds. It is a further object of this invention to provide a recording medium having excellent drying characteristics and also high image print densities and a good gloss. We unexpectedly found that these objectives can be met by providing a multilayer structure that employs different photo-initiators in different layers. The invention thus provides a membrane comprising at least two curable compositions that comprise prior to curing at least one type of monomer, at least two types of photo-initiator wherein the photo-initiator in the first layer is different from the photo-initiator in the other layer or at least one of the other layers, and a solvent. By the present invention a porous membrane can be prepared for a variety of applications such as separation, concentration and purification of gasses, liquids and mixtures. By coating said compositions on a substrate, curing the coated compositions thereby causing phase separation between the crosslinked compounds and the solvent a substrate provided with a porous multilayer is formed. The membrane may be subjected to a washing and/or drying step. This porous membrane can be used in various applications and is characterized by its high solvent flux and/or uptake capability.

By this invention porous membranes can be designed and prepared with varying properties throughout the porous membrane. So an outer layer can be designed and prepared having colorant fixing properties, e.g. by introducing mordants in the outer layer, and an inner porous layer can be constructed having an optimized water uptake capability. Alternatively to introduce the so-called backview option in backlit material, the outer layer is optimized for scratch resistance and the colorant fixing property is located in the layer closest to a transparent support. Alternatively, for separation membrane applications, the porosity of the outer layer is controlled to determine the separation characteristics while the inner layer(s) are optimized to give both strength to the membrane and allow high solvent fluxes.

For a multilayer membrane the type and concentration of photo-initiator in each layer can be chosen independently. For example, when in a multilayer structure the photo-initiator in the toplayer is different from the photo-initiator in lower layers this may give more efficient curing with low initiator concentrations than when a single type of initiator is applied throughout all layers. Some types of photo-initiator are most effective in curing the surface while other types cure much deeper into the layer when irradiated with radiation. For the lower layers a good through cure is important and for a high efficiency of curing it is preferred to select a photo-initiator that has an absorption spectrum not fully overlapping with the spectrum of the photo-initiator applied in the toplayer. Preferably the difference in absorption maximum between photo-initiators in the top layer and in the bottom layer is at least 20 nm. If UV radiation is used a light source can be selected having emissions at several wavelengths. The combination of UV light source and photo-initiators can be optimized so that sufficient radiation penetrates to the lower layers to activate the photo-initiators. A typical example is an H-bulb with an output of 600 Watts/inch as supplied by Fusion UV Systems which has emission maxima around 220 nm, 255 nm, 300 nm, 310 nm, 365 nm, 405 nm, 435 nm, 550 nm and 580 nm. Alternatives are the V-bulb and the D-bulb which have a different emission spectrum. It is obvious that there need to be sufficient overlap between the spectrum of the UV light source and that of the photo-initiators. From a choice of light sources and photo-initiators optimal combinations can be made. The method of multiple types of photo-initiator allows for thicker layers to be cured efficiently with the same intensity of irradiation. Additionally, by applying different types of photo-initiator, characteristics such as gloss and porosity can be optimized to levels not possible with a single type of photo-initiator.

If separated, the porous membrane of the present invention can be fixed afterwards to all kinds of supports. Separation from the substrate can be easily achieved by proper treatment of the substrate e.g. by applying a 'release' layer comprising for instance a siloxane based polymer before coating the curable compound mixtures on the substrate. The isolated porous membrane of this invention can be separately attached to a substrate via an adhesive layer. This adhesive layer can also impart certain propertied to the resulting medium. Throughout the present text the terms curable compound and (curable) monomer are used interchangeably.

In another embodiment substrate and porous layers are not separated to give an isolated porous membrane, but are used as formed e.g. a membrane coated on a nonwoven support or on a glossy support in which the porous membrane can function as a colorant receiving layer when used in recording media. This can be for example an inkjet recording medium in which case the colorant is an ink-solution.

In general the dry thickness of the porous membrane of this invention in isolated form may typically be between 10 μm and 500 μm, more preferably between 30 and 300 μm. When adhered to a substrate the membrane need not give internal strength and the optimal thickness is based on properties such as solvent uptake capacity. In the latter case the dry thickness is typically between 5 and 50 μm. When the substrate is impermeable to aqueous solvents the dry thickness is preferably between 20 and 50 μm, while when the substrate is able to absorb part of the solvent as is the case for e.g. (coated) base paper the preferred dry thickness is between 5 and 30 μm. The thickness of the various layers can be selected freely depending on the properties one likes to achieve.

For a two-layer membrane structure the bottom layer preferably has a dry thickness of between 3 and 50 μm, preferably between 7 and 40 μm, most preferably between 10 and 30 μm and the toplayer preferably between 1 and 30 μm, preferably between 2 and 20 μm, most preferably between 4 and 15 μm.

In another embodiment a substrate is coated with at least three layers. After applying the curable compositions to the substrate, curing and drying, a membrane comprising at least three layers is formed, which three layers then comprise at least one bottom layer with a dry thickness of typically between 3 and 50 μm, preferably between 5 and 40 μm, most preferably between 7 and 30 μm, at least one middle layer with a dry thickness of typically between 1 and 30 μm, preferably between 2 and 20 μm, most preferably between 3 and 15 μm, and at least one toplayer above the middle layer. The top layer preferably has a dry thickness of less than 10 μm, preferably of between 0.1 and 8 μm, most preferably between 0.4 and 4 μm.

In a preferred embodiment, the substrate is coated with three or more curable compound mixtures, which after curing and drying results in a recording medium in which all layers are layers comprising a porous membrane of the invention. Said mixtures may have substantially the same or different compositions depending on the results one likes to achieve. Furthermore the curable compound mixtures might be coated simultaneously and then cured or might be coated consecutively and cured. Consecutively means, that a first mixture is coated, then cured; then a second mixture is coated, cured and so on. In the latter situation it is likely that at least a part of the second mixture is impregnating the first layer so care has to be taken that the pores of the resulting membrane do not become blocked.

Many curable compounds are hydrophobic in nature and require high concentrations of organic apolar solvents to obtain a clear solution. Large amounts of volatile organic solvents are not preferred since these may result in hazardous conditions in the production area during the drying phase of the membrane while non-volatile solvents are difficult to remove and are thus not preferred either. For reasons of safety, health and the environment, as well as from economic viewpoint, water is the most preferred solvent. It was found that suitable curable compounds are water reducible to form an aqueous solution. A compound is regarded as water reducible when at 25° C. at least 2 wt % of water is compatible with the curable compound. Preferably at least 4 wt %, more preferably at least 10 wt % of water is miscible with the curable compounds of the invention. Preferably environmental friendly solvents, such as water, are used. A solvent comprising water is generally referred to as an aqueous solvent. The aqueous solvent preferably comprises at least 30 wt. % water, more preferably at least 50 wt %, and may further comprise other polar or apolar co-solvents. In case the miscibility with water is not sufficient to dissolve the curable compound completely admixing of a co-solvent is desirable. Preferably the solvent contains at least 60 wt. %, preferably at least 70 wt. % and more preferably at least 80 or even 90 wt. % of water. In a specific embodiment the solvent is water and does not contain organic co-solvents. For example, 10% CN132, 27.5% CN435 and 62.5% water, or 21.5% CN132, 21.5% CN435 and 57% water, or 60% CN132 and 40% water, or 49.75% CN132, 49.75% water and 0.5% dodecyltrimethylammonium chloride can give a favorable porous matrix. CN132 and CN435 are curable monomers available from Cray Valley, France. CN132 is a low viscosity aliphatic epoxy acrylate. CN435 (available in the US as SR9035) is an ethoxylated trimethylolpropane triacrylate.

As co-solvents, polar volatile solvents that can be sufficiently removed by drying are preferred. Preferred co-solvents are lower alkyl alcohols, alkanones, alkanals, esters, or alkoxy-alkanes. The term "lower alkyl" means that the alkyl chain contains less than 7, preferably less than 6 and more preferably less than carbon-atoms, preferably 1-4 carbon atoms. In one embodiment the solvent is a mixture of isopropanol and water. Other preferred co-solvents are e.g. methanol, ethanol, 1-propanol, acetone, ethylacetate, dioxane, methoxy ethanol and dimethylformamide. Most preferred are co-solvents having a boiling point lower than that of water.

The solubility of the curable compound in the solvent is another parameter of importance. Preferably the curable composition is a clear solution. The solvent can be chosen such that the selected curable compound or compound mixture is completely dissolved. A clear solution is more stable and is generally preferred. However a slight turbidity usually does not cause instability and is in most cases acceptable. On the other hand for phase separation to occur the growing polymer should be insoluble in the solvent. This puts certain restrictions to the curable compounds that can be selected in combination with a certain solvent. Possible methods that can facilitate the selection of suitable combinations are described in e.g. EP-A-216622 (cloud point) and U.S. Pat. No. 3,823,027 (Hansen system).

To obtain a large difference in solubility between the initial compounds and the resulting polymer and thus a fast phase separation preferably the molecular weight (MW) of the initial compounds is not too large, although also with high-MW polymers porous membranes can be realized by careful selection of the solvent. Preferably the MW of the curable monomers or oligomers is less than 10000 Dalton, more preferably less than 5000 Dalton. Good results are obtained with compounds having a MW of less than 1000 Dalton.

In addition to the curable compound having a water reducibility of between 2 wt % and 50 wt % other types of curable monomers may be present in the curable composition. Curable compounds according the invention are described for example in "Development of ultraviolet and electron beam curable materials" (edited by Y. Tabata, CMC publishing, 2003, ISBN 4882317915) and may be selected from, but are not limited to epoxy compounds, oxetane derivatives, lactone derivatives, oxazoline derivatives, cyclic siloxanes, or ethenically unsaturated compound such as acrylates, methacrylates, polyene-polythiols, vinylethers, vinylamides, vinylamines, allyl ethers, allylesters, allylamines, maleic acid derivaties, itacoic acid derivaties, polybutadienes and styrenes. Preferably as the main component (meth)acrylates are used, such as alkyl-(meth)acrylates, polyester-(meth)acrylates, urethane-(meth)acrylates, polyether-(meth)acrylates, epoxy-(meth)acrylates, polybutadiene-(meth)acrylates, silicone-(meth)acrylates, melamine-(meth)acrylates, phosphazene-(meth)acrylates, (meth)acrylamides and combinations thereof because of their high reactivity. Other types of curable compounds may be combined with the main component in order to modify certain characteristics of the resulting membrane. These compounds can be used in the form of a monomer solution, monomer suspension, monomer dispersion, oligomer solution, oligomer suspension, oligomer dispersion, polymer solution, polymer suspension and polymer dispersion.

In order to prepare the porous membrane of the invention the curable compositions and the processing conditions have to be selected with care. Upon irradiation the monomers (or oligomers or prepolymers) crosslink to gradually form polymers. During this process the solubility of the growing polymer in the solvent decreases resulting in phase separation and by result the polymer separates from the solution. Finally the polymer forms a network with a porous structure wherein the solvent fills the pores. Upon drying the solvent is removed and a porous membrane remains. In certain embodiments the membrane is not dried but optionally washed and kept in a wet condition to prevent collapsing of the pores. To obtain an optimal structure of the porous membrane it is important to carefully select the concentration of the curable compound or mixture of curable compounds. When the concentration is too low, it is assumed that upon curing no network structure is formed and when the concentration is too high experiments indicate that a more or less homogenous gelled layer may be formed that yields a non-porous, transparent layer after drying. Also when the monomers are too soluble in the solvent no phase separation occurs and then usually a gel structure is formed after polymerization. A porous structure is essential for a high solvent flux. In view of this, the concentration of the curable compound or compounds in the solvent is preferably between 10 and 80 wt. %, more preferably between 20 and 70 wt. %, most preferably between 30 and 60 wt %.

When the porous membrane is used as a colorant receiving medium, e.g. an inkjet recording medium, where aqueous inks are used to form images the membrane should have a hydrophilic character in order to rapidly absorb the aqueous solvents involved. In the case that the curable compositions contains water as main solvent the polymer formed generally must have hydrophobic character because incompatibility with the solvent is important for phase separation to occur. This implies that for this application the membrane of the invention must have both hydrophilic character and hydrophobic character. These seemingly contradictory demands can be realized for instance by selecting a curable compound that has an amphiphilic structure: a part of the molecule is hydrophilic and another part has a hydrophobic character. An amphiphilic monomer may have both hydrophilic and hydrophobic groups or may have amphiphilic groups (e.g. a (1,2- or 1,3-) propylene oxide chain or a (1,2-, 1,3- or 1,4-) butylene oxide chain). Examples of hydrophobic groups are aliphatic or aromatic groups, alkyl chains longer than C3 and the like. An alternative approach is to include in the curable compositions curable compounds that are hydrophilic and those that are hydrophobic. The latter method allows the properties of the membrane to be controlled by varying the ratio of both types of curable compounds. Hydrophilic monomers are for example water soluble monomers and monomers having hydrophilic groups such as hydroxy, carboxylate, sulfate, amine, amide, ammonium, ethylene oxide chain and the like. Amphiphilicity can be obtained in several ways. Amphiphilic monomers can for instance be made by introducing a polar group (such as hydroxy, ether, carboxylate, sulfate, amine, amide, ammonium, etc.) into the structure of a hydrophobic monomer. On the other hand starting from a hydrophilic structure an amphiphilic monomer can be made by increasing the hydrophobic character by introducing e.g. alkyl or aromatic groups.

Good results are obtained when at least one of the curable compounds has a restricted water reducibility. Preferably water is miscible with the curable monomer at 25° C. in a weight ratio of between 2/98 and 50/50, more preferably between 4/96 and 50/50, even more preferably between 10/90 and 50/50. Many suitable curable compounds are amphiphilic in nature. A suitable concentration of the monomer can be achieved by addition of a co-solvent, a surfactant, by adjusting the pH of the composition or by mixing in monomers that maintain a good solubility at higher water loads. The miscibility ratios of water with the latter monomers are typically larger than 50 wt. % at 25° C.

Another possible method of achieving the porous membrane of the invention is applying a mixture of a monomer having a poor miscibility with water, typically miscibility ratios of water with monomer at 25° C. lower than 2 wt. %, with a monomer having a good miscibility, i.e. a miscibility of water in the monomer at 25° C. larger than 50 wt. %. Many different types of monomers can be successfully applied in the invention by carefully selecting combinations of two, three or more types of monomers and optimizing their respective concentrations and solvent composition.

Suitable monomers exhibiting a miscibility with water at 25° C. in a weight ratio water/monomer between 2/98 and 50/50 are: poly(ethylene glycol) diacrylate (preferably MW<500, e.g. triethylene glycol diacrylate, tetraethylene glycol diacrylate, etc.), ethylene glycol epoxylate dimethacrylate, glycerol diglycerolate diacrylate, propylene glycol glycerolate diacrylate, tripropylene glycol glycerolate diacrylate, oligo(propylene glycol) diacrylate, poly(propylene glycol) diacrylate, oligo(propylene glycol) glycerolate diacrylate, poly(propylene glycol) glycerolate diacrylate, oligo(butylene oxide) diacrylate, poly(butylene oxide) diacrylate, oligo(butylene oxide) glycerolate diacrylate, poly(butylene oxide) glycerolate diacrylate, ethoxylated trimethylolpropane triacrylate (ethoxylation 3-10 mol), ethoxylated bisphenol-A diacrylate (ethoxylation 3-10 mol), 2-hydroxyethyl acrylate, 2-hydroxypropylacrylate, 2-hydroxy-3-phenoxy propyl acrylate, 2-(ethoxyethoxyl)ethylacrylate, N,N'-(m)ethylene-bis(acrylamide). Also suitable are commercially available compounds such as CN129 (an epoxy acrylate), CN131B (a monofunctional aliphatic epoxy acrylate), CN133 (a trifunctional aliphatic epoxy acrylate), CN9245 (a trifunctional urethane acrylate), CN3755 (an amino diacrylate), CN371 (an amino diacrylate), all from Cray Valley, France.

Suitable (hydrophilic) monomers having a good miscibility with water (weight ratio water/monomer larger than 50/50 at 25° C.) are: poly(ethylene glycol) (meth)acrylates (preferably MW>500), poly(ethylene glycol) di(meth)acrylates (preferably MW>500), ethoxylated trimethylolpropane triacrylates (ethoxylation more than 10 mol), (meth)acrylic acid, (meth)acrylamide, 2-(dimethylamino)ethyl (meth)acrylate, 3-(dimethylamino)propyl (meth)acrylate, 2-(diethylamino) ethyl (meth)acrylate, 2-(dimethylamino)ethyl (meth)acrylamide, 3-(dimethylamino)propyl (meth)acrylamide, 2-(dimethylamino)ethyl (meth)acrylate quartenary ammonium salt (chloride or sulfate), 2-(diethylamino)ethyl (meth)acrylate quartenary ammonium salt (chloride or sulfate), 2-(dimethylamino)ethyl (meth)acrylamide quartenary ammonium salt (chloride or sulfate), 3-(dimethylamino)propyl (meth)acrylamide quartenary ammonium salt (chloride or sulfate).

Suitable (hydrophobic) monomers having a poor miscibility with water (weight ratio water/monomer smaller than 2/98 at 25° C.) are: alkyl (meth)acrylates (e.g. ethyl acrylate, n-butyl acrylate, n-hexylacrylate, octylacrylate, laurylacrylate), aromatic acrylates (phenol acrylate, alkyl phenol acrylate, etc.), aliphatic diol (di)(meth)acrylates (e.g. 1,4-butanediol diacrylate, 1,6-hexanediol diacrylate, Hydroxypivalic acid neopentylglycol diacrylate, neopentylglycol diacrylate, tricyclodecanedimethanol diacrylate), trimethylolpropane triacrylate, glyceryl triacrylate, pentaerythitol triacrylate, pentaerythitol tetraacrylate, dipentaerythritol pentaacrylate, dipentaerythritol hexaacrylate, ditrimethylolpropane tetraacrylate, styrene derivatives, divinylbenzene, vinyl acetate, vinyl alkyl ethers, alkene, butadiene, norbonene, isoprene, polyester acrylates having alkyl chain longer than $C_4$, polyurethane acrylates having alkyl chain longer than $C_4$, polyamide acrylates having alkyl chain longer than $C_4$.

Preferably the curable compositions comprise between 1-100 wt % of monomers that are miscible with water in a ratio water/monomer of between 2/98 and 50/50 at 25° C., more preferably between 10-80 wt %, most preferably between 40-70 wt % based on the total amount of curable monomers. The curable compositions may additionally comprise up to 99 wt %, preferably between 30-60 wt % of monomers that are miscible with water in a ratio water/monomer larger than 50/50 at 25° C., based on the total amount of curable monomers. Also monomers having a poor miscibility may be present in the mixture up to 99 wt %. Another way of obtaining a membrane according the invention is to combine between 1 and 99 wt %, preferably between 30 and 80 wt % of monomers having a good miscibility with water and between 1-99 wt %, preferably between 10-80 wt %, more preferably between 20-70 wt % of monomers that have a poor miscibility with water in a ratio water/monomer less than 2/98 at 25° C.

Photo-initiators may be used in accordance with the present invention and can be mixed into the mixtures of the curable compound(s), preferably prior to applying the mixture to the support. Photo-initiators are usually required when the coated mixture is cured by UV or visible light radiation. Suitable photo-initiators are those known in the art such as radical type, cation type or anion type photo-initiators.

Examples of radical type I photo-initiators are α-hydroxyalkylketones, such as 2-hydroxy-1-[4-(2-hydroxyethoxy) phenyl]-2-methyl-1-propanone (Irgacure™ 2959: Ciba), 1-hydroxy-cyclohexyl-phenylketone (Irgacure™ 184: Ciba), 2-hydroxy-2-methyl-1-phenyl-1-propanone (Sarcure™ SR1173: Sartomer), oligo[2-hydroxy-2-methyl-1-{4-(1-methylvinyl)phenyl}propanone] (Sarcure™ SR1130: Sartomer), 2-hydroxy-2-methyl-1-(4-tert-butyl-)phenylpropan-1-one, 2-hydroxy-[4'-(2-hydroxypropoxy)phenyl]-2-methylpropan-1-one, 1-(4-Isopropylphenyl)-2-hydroxy-2-methyl-propanone (Darcure™ 1116: Ciba); α-aminoalkylphenones such as 2-benzyl-2-(dimethylamino)-4'-morpholinobutyrophenone (Irgacure™ 369: Ciba), 2-methyl-4'-(methylthio)-2-morpholinopropiophenone (Irgacure™ 907: Ciba); α,α-dialkoxyacetophenones such as α,α-dimethoxy-α-phenylacetophenone (Irgacure™ 651: Ciba), 2,2-diethyoxy-1,2-diphenylethanone (Uvatone™ 8302: Upjohn), α,α-diethoxyacetophenone (DEAP: Rahn), α,α-di-(n-butoxy)acetophenone (Uvatone™ 8301: Upjohn); phenylglyoxolates such as methylbenzoylformate (Darocure™ MBF: Ciba); benzoin derivatives such as benzoin (Esacure™ BO: Lamberti), benzoin alkyl ethers (ethyl, isopropyl, n-butyl, iso-butyl, etc.), benzylbenzoin benzyl ethers, Anisoin; mono- and bis-Acylphosphine oxides, such as 2,4,6-trimethylbenzoyl-diphenylphosphine oxide (Lucirin™

TPO: BASF), ethyl-2,4,6-trimethylbenzoylphenylphosphinate (Lucirin™ TPO-L: BASF), bis(2,4,6-trimethylbenzoyl)-phenylphosphine oxide (Irgacure™ 819: Ciba), bis(2,6-dimethoxybenzoyl)-2,4,4-trimethyl-pentylphosphineoxide (Irgacure 1800 or 1870). Other commercially available photo-initiators are 1-[4-(phenylthio)-2-(O-benzoyloxime)]-1,2-octanedione (Irgacure OXE01), 1-[9-ethyl-6-(2-methylbenzoyl)-9H-carbazol-3-yl]-1-(O-acetyloxime)ethanone (Irgacure OXE02), 2-hydroxy-1-{4-[4-(2-hydroxy-2-methyl-propionyl)-benzyl]-phenyl}-2-methyl-propan-1-one (Irgacure127), oxy-phenyl-acetic acid 2-[2 oxo-2-phenyl-acetoxy-ethoxy]-ethyl ester (Irgacure754), oxy-phenyl-acetic-2-[2-hydroxy-ethoxy]-ethyl ester (Irgacure754), 2-(dimethylamino)-2-(4-methylbenzyl)-1-[4-(4-morpholinyl)phenyl]-1-butanone (Irgacure 379), 1-[4-[4-benzoylphenyl)thio]phenyl]-2-methyl-2-[(4-methylphenyl)sulfonyl)]-1-propanone (Esacure 1001M from Lamberti), 2,2'-bis(2-chlorophenyl)-4,4', 5, 5'-tetraphenyl-1,2'-bisimidazole (Omnirad BCIM from IGM).

Examples of type II photo-initiators are benzophenone derivatives such as benzophenone (Additol™ BP: UCB), 4-hydroxybenzophenone, 3-hydroxybenzophenone, 4,4'-dihydroxybenzophenone, 2,4,6-trimethylbenzophenone, 2-methylbenzophenone, 3-methylbenzophenone, 4-methylbenzophenone, 2,5-dimethylbenzophenone, 3,4-dimethylbenzophenone, 4-(dimethylamino)benzophenone, [4-(4-methylphenylthio)phenyl]phenyl-methanone, 3,3'-dimethyl-4-methoxy benzophenone, methyl-2-benzoylbenzoate, 4-phenylbenzophenone, 4,4-bis(dimethylamino)benzophenone, 4,4-bis(diethylamino)benzophenone, 4,4-bis(ethylmethylamino)benzophenone, 4-benzoyl-N,N,N-trimethylbenzenemethanaminium chloride, 2-hydroxy-3-(4-benzoylphenoxy)-N,N,N-trimethyl-1-propanamium chloride, 4-(13-Acryloyl-1,4,7,10,13-pentaoxamidecyl)benzophenone (Uvecryl™ P36: UCB), 4-benzoyl-N,N-dimethyl-N-[2-(1-oxo-2-propenyl)oxy]ethylbenzenemethanaminium chloride, 4-benzoyl-4'-methyldiphenyl sulphide, anthraquinone, ethylanthraquinone, anthraquinone-2-sulfonic acid sodium salt, dibenzosuberenone; acetophenone derivatives such as acetophenone, 4'-phenoxyacetophenone, 4'-hydroxyacetophenone, 3'-hydroxyacetophenone, 3'-ethoxyacetophenone; thioxanthenone derivatives such as thioxanthenone, 2-chlorothioxanthenone, 4-chlorothioxanthenone, 2-isopropylthioxanthenone, 4-isopropylthioxanthenone, 2,4-dimethylthioxanthenone, 2,4-diethylthioxanthenone, 2-hydroxy-3-(3,4-dimethyl-9-oxo-9H-thioxanthon-2-yloxy)-N,N,N-trimethyl-1-propanaminium chloride (Kayacure™ QTX: Nippon Kayaku); diones such as benzyl, camphorquinone, 4,4'-dimethylbenzyl, phenanthrenequinone, phenylpropanedione; dimethylanilines such as 4,4',4"-methylidyne-tris(N,N-dimethylaniline) (Omnirad™ LCV from IGM); imidazole derivatives such as 2,2'-bis(2-chlorophenyl)-4,4',5,5'-tetraphenyl-1,2'-bisimidazole; titanocenes such as bis(eta-5-2,4-cyclopentadiene-1-yl)-bis-[2,6-difluoro-3-1H-pyrrol-1-yl]phenyl]titanium (Irgacure™784: Ciba); iodonium salt such as iodonium, (4-methylphenyl)-[4-(2-methylpropyl-phenyl)-hexafluorophosphate (1-). If desired combinations of photo-initiators may also be used.

For acrylates, diacrylates, triacrylates or multifunctional acrylates, type I photo-initiators are preferred. Especially alpha-hydroxyalkylphenones, such as 2-hydroxy-2-methyl-1-phenyl propan-1-one, 2-hydroxy-2-methyl-1-(4-tert-butyl-) phenylpropan-1-one, 2-hydroxy-[4'-(2-hydroxypropoxy)phenyl]-2-methylpropan-1-one, 2-hydroxy-1-[4-(2-hydroxyethoxy)phenyl]-2-methyl propan-1-one, 1-hydroxycyclohexylphenylketone and oligo[2-hydroxy-2-methyl-1-{4-(1-methylvinyl)phenyl}propanone], alpha-aminoalkylphenones, alpha-sulfonylalkylphenones and acylphosphine oxides such as 2,4,6-trimethylbenzoyl-diphenylphosphine oxide, ethyl-2,4,6-trimethylbenzoylphenylphosphinate and bis(2,4,6-trimethylbenzoyl)-phenylphosphine oxide, are preferred. Preferably the ratio of photo-initiator and curable compound(s) in each composition is between 0.001 and 0.1, more preferably between 0.005 and 0.05, based on weight. It is preferred to minimize the amount of photo-initiator used, in other words preferably all photo-initiator has reacted after the curing step (or curing steps). Remaining photo-initiator may have adverse effects such as yellowing or degradation of dyes in case the membrane is used as a recording medium. When applied as a separation membrane excessive washing may be required to wash out remaining photo-initiator.

Curing rates may be increased by adding amine synergists to one or more of the curable compounds. Amine synergists are known to enhance reactivity and retard oxygen inhibition. Suitable amine synergists are e.g. free alkyl amines such as triethylamine, methyldiethanol amine, triethanol amine; aromatic amine such as 2-ethylhexyl-4-dimethylaminobenzoate, ethyl-4-dimethylaminobenzoate and also polymeric amines as polyallylamine and its derivatives. Curable amine synergists such as ethylenically unsaturated amines (e.g. (meth) acrylated amines) are preferable since their use will give less odor, lower volatility and less yellowing due to its ability to be incorporated into the polymeric matrix by curing.

The amount of amine synergists is preferably from 0.1-10 wt % based on the amount of curable compounds in the curable composition, more preferably from 0.3-3 wt % based on the amount of curable compounds.

The curable compound mixtures are preferably subjected to radiation to obtain the porous membrane. In principle (electromagnetic) radiation of any suitable wavelength can be used, such as for example ultraviolet, visible or infrared radiation, as long as it matches the absorption spectrum of the photo-initiator.

Irradiation by ultraviolet light is preferred. Suitable wavelengths are for instance UV-A (400-320 nm), UV-B (320-280 nm), UV-C (280-200 nm), provided the wavelength matches with the absorbing wavelength of the photo-initiator, if present.

Suitable sources of ultraviolet light are mercury arc lamps, carbon arc lamps, low pressure mercury lamps, medium pressure mercury lamps, high pressure mercury lamps, swirlflow plasma arc lamps, metal halide lamps, xenon lamps, tungsten lamps, halogen lamps, lasers and ultraviolet light emitting diodes. Particularly preferred are ultraviolet light emitting lamps of the medium or high pressure mercury vapor type. In addition, additives such as metal halides may be present to modify the emission spectrum of the lamp. In most cases lamps with emission maxima between 200 and 450 nm are most suitable.

The energy output of the exposing device may be between 20 and 240 W/cm, preferably between 40 and 150 W/cm but may be higher as long as the desired exposure dose can be realized. The exposure intensity is one of the parameters that can be used to control the extent of curing which influences the final structure of the membrane. Preferably the exposure dose is at least 40 mJ/cm$^2$, more preferably between 40 and 600 mJ/cm$^2$, most preferably between 70 and 220 mJ/cm$^2$ as measured by an High Energy UV Radiometer (UV Power Puck™ from EIT—Instrument Markets) in the UV-B range indicated by the apparatus. Exposure times can be chosen freely but need not be long and are typically less than 1 second.

The pH of the curable compositions is preferably chosen between a value of 2 and 11, more preferably between 3 and 8. The optimum pH depends on the used monomers and can be determined experimentally. The curing rate appeared to be pH dependent: at high pH the curing rate is clearly reduced resulting in a less porous membrane. At low pH values (2 and lower) yellowing of the membrane occurs upon aging which is not desired when a good whiteness is preferred.

Where desired, a surfactant or combination of surfactants may be added to one or more of the compositions as a wetting agent, to adjust surface tension, or for other purposes such as a good gloss. It is within the ability of one skilled in the art to employ a proper surfactant depending upon desired use and the substrate to be coated. Commercially available surfactants may be utilized, including radiation-curable surfactants. Surfactants suitable for use in the curable composition include nonionic surfactants, ionic surfactants, amphoteric surfactants and combinations thereof. Preferred nonionic surfactants include ethoxylated alkylphenols, ethoxylated fatty alcohols, ethylene oxide/propylene oxide block copolymers, fluoroalkyl ethers, and the like. Preferred ionic surfactants include, but are not limited to, the following: alkyltrimethylammonium salts wherein the alkyl group contains from 8 to 22 (preferably 12 to 18) carbon atoms; alkylbenzyldimethylammonium salts wherein the alkyl group contains from 8 to 22 (preferably 12 to 18) carbon atoms, and ethylsulfate; and alkylpyridinium salts wherein the alkyl group contains from 8 to 22 (preferably 12 to 18) carbon atoms. Surfactants may be fluorine based or silicon based. Examples of suitable fluorosurfactants are: fluoro $C_2$-$C_{20}$ alkylcarboxylic acids and salts thereof, disodium N-perfluorooctanesulfonyl glutamate, sodium 3-(fluoro-C6-$C_{11}$ alkyloxy)-1-$C_3$-$C_4$ alkyl sulfonates, sodium 3-(omega-fluoro-$C_6$-$C_8$ alkanoyl-N-ethylamino)-1-propane sulfonates, N-[3-(perfluorooctanesulfonamide)-propyl]-N,N-dimethyl-N-carboxymethylene ammonium betaine, perfluoro alkyl carboxylic acids (e.g. $C_7$-$C_{13}$-alkyl carboxylic acids) and salts thereof, perfluorooctane sulfonic acid diethanolamide, Li, K and Na perfluoro $C_4$-$C_{12}$ alkyl sulfonates, Li, K and Na N-perfluoro $C_4$-$C_{13}$ alkane sulfonyl-N-alkyl glycine, fluorosurfactants commercially available under the name Zonyl® (produced by E.I. Du Pont) that have the chemical structure of $RfCH_2CH_2SCH_2CH_2CO_2Li$ or $RfCH_2CH_2$—O—$(CH_2CH_2O)_x$ H wherein $Rf=F(CF_2CF_2)_{3-8}$ and x=0 to 25, N-propyl-N-(2-hydroxyethyl)perfluorooctane sulfonamide, 2-sulfo-1,4-bis(fluoroalkyl)butanedioate, 1,4-bis(fluoroalkyl)-2-[2-N,N,N-trialkylammonium)alkyl amino] butanedioate, perfluoro $C_6$-$C_{10}$ alkylsulfonamide propyl sulfonyl glycinates, bis-(N-perfluorooctylsulfonyl-N-ethanolaminoethyl)phosphonate, mono-perfluoro $C_6$-$C_{16}$ alkyl-ethyl phosphonates, and perfluoroalkylbetaine. Also useful are the fluorocarbon surfactants described e.g. in U.S. Pat. No. 4,781,985 and in U.S. Pat. No. 6,084,340.

Silicon based surfactants are preferably polysiloxanes such as polysiloxane-polyoxyalkylene copolymers. Such copolymers may be for example dimethylsiloxane-methyl (polyoxyethylene) copolymer, dimethylsiloxane-methyl (polyoxyethylene-polyoxypropylene) siloxane copolymer, trisiloxane alkoxylate as a copolymer of trisiloxane and polyether, and siloxane propoxylate as a copolymer of siloxane and polypropylene oxide. The siloxane copolymer surfactants may be prepared by any method known to those having skill in the art and can be prepared as random, alternate, block, or graft copolymers. The polyether siloxane copolymer preferably has a weight-average molecular weight in a range of 100 to 10,000. Examples of polyether siloxane copolymers commercially available in the market include SILWET DA series, such as SILWET 408, 560 or 806, SILWET L series such as SILWET-7602 or COATSIL series such as COATSIL 1211, manufactured by CK WITCO; KF351A, KF353A, KF354A, KF618, KF945A, KF352A, KF615A, KF6008, KF6001, KF6013, KF6015, KF6016, KF6017, manufactured by SHIN-ETSU; BYK-019, BYK-300, BYK-301, BYK-302, BYK-306, BYK-307, BYK-310, BYK-315, BYK-320, BYK-325, BYK-330, BYK-333, BYK-331, BYK-335, BYK-341, BYK-344, BYK-345, BYK-346, BYK-348, manufactured by BYK-CHEMIE; and GLIDE series such as GLIDE 450, FLOW series such as FLOW 425, WET series such as WET 265, manufactured by TEGO.

Surfactants may be added in the curable composition and/or may be introduced by impregnation of the membrane for the purpose of improving printer transportability, blocking resistance and waterproofness. The surfactant, when used, preferably is present in an amount between 0.01 and 2% based on the dry weight of the membrane, more preferably between 0.02 and 0.5%. Preferably the surfactants are soluble in the composition in the concentration used. When an aqueous solvent is used preferably the solubility of the surfactant in water at 25° C. is at least 0.5%.

For a fast uptake of especially aqueous inks the surface needs to be hydrophilic. The hydrophilicity of the surface is suitably expressed by measuring the contact angle of water drops. Values below 80° are indicative for hydrophilic surfaces and are preferred for applications as ink receiving layer.

In accordance with the present invention, a membrane is referred to as "porous, nanoporous or microporous" if it contains a substantial amount of pores preferably having a diameter of between 0.0001 and 2.0 μm. More preferably the majority of the pores of the porous membrane of the invention have a size of between 0.001 and 1.0 μm, even more preferably between 0.003 and 0.7 μm. For selected embodiments the average pore diameter preferably is between 0.01 and 1.0 μm, more preferably between 0.03 and 0.4 μm. There is no limitation as to the pore shape. The pores can for instance be spherical or irregular or a combination of both. Preferably the pores are inter-connected, since this will contribute to a high flux or quick solvent absorption.

The porosity of the membrane is preferably between 5 and 90 percent as determined by analyzing SEM cross-section images. The porosity is determined by the following formula:

$$\frac{\text{Dry thickness [m]}}{\text{Coated amount of solids [kg/m}^2\text{]}} * 100\% - 100\%$$

wherein the density of the coated solids (matrix) is assumed to be 1 kg/dm$^3$. More preferably the porosity is between 10 and 70 percent, even more preferably between 20 and 50%.

For membranes applied as ink receiving layer it is important to exhibit a high gloss for which the surface layer need to be smooth and the size and total area of the pores on the surface of the membrane must be controlled within certain limits. A good gloss without loss in ink absorption speed can be obtained by controlling the area occupied by pores to preferably between 0.1 and 30%. More preferably the pore area is between 0.2 and 25%, even more preferably between 0.3 and 18% for maximum gloss with high ink absorption speed. Pore area is determined by diameter and amount of pores. This means that for a certain pore area the amount of pores varies depending on the pore diameter. In general a low frequency of large pores is less preferred than a high frequency of small pores. The absolute average pore diameter of the surface pores is preferably smaller than 1.2 μm, more preferably between 0.02 and 1 μm, even more preferably between 0.05 and 0.7 μm. For selected embodiments a range between 0.06 and 0.3 μm is preferred. Good gloss can be additionally expressed in a surface roughness (Ra) value. Ra values are influenced by pore diameter/pore area. Preferred Ra values for membranes having a good gloss are below 0.8 μm, more preferably below 0.5 μm, even more preferably below 0.3 μm and most preferably below 0.2 μm. A glossy appearance is thought to be determined mainly by the smoothness of the surface area between the pores. In ISO 13565-1 (1998) and JIS B0671-1 (2002) a method is described by which it is possible to determine the Ra value of the surface eliminating the contribution of the pores to the calculation. In a special embodiment the membrane is composed of distinct structures: an isotropic bulk matrix in the form of an open polymer network and a thin surface layer of a completely different structure. This surface layer or skin layer is a continuous layer having pores that are not connected and can be described as a perforated continuous layer. By varying the process and recipe conditions the number and size of surface pores can be controlled according to desired specifications. This surface layer is thought to contribute to the gloss of the membrane. For applications such as reversed osmosis it may be preferred that there are no pores at all at the surface or only pores of a very small diameter, which means that the skin layer can be regarded as a closed continuous layer. For the application as ink receiving layer the surface layer is assumed to prevent the dyes present in the ink from being absorbed deep into the membrane which would lead to a low optical density of the printed image. So the surface layer contributes to a high optical density. On the other hand a skin layer reduces the flow rate through the membrane which may result in worse drying properties. Therefore preferably this skin layer is thin, having a thickness less than 3 μm, more preferably the thickness of the skin layer is less than 1.5 μm e.g. between 0.1 and 1.2 μm. Except for the thin skin layer the membrane is preferably symmetric, although an asymmetric structure to some extent is allowable.

An important characteristic of the membrane is the swellability of the porous layer. In addition to the porosity the swellability contributes to the speed and capacity of solvent uptake. Depending on the desired properties, a certain balance can be selected between the porosity and the swellability. To attain a certain level of solvent uptake a high porosity can be combined with a low swelling behavior or vice versa. This enables a large variation in membrane structures all with a good solvent uptake speed. For membranes applied as ink receiving layer the swelling preferably is between 1 and 50 μm, more preferably between 2 μm and 30 μm, most preferably between 3 and 20 μm. Because the dry thickness of the porous layer may vary depending on the desired application the swelling is more appropriately expressed in a relative way as a percentage of the dry thickness. Preferably the swelling is at least 5%, more preferably between 6 and 150% of the dry thickness of the porous membrane, even more preferably between 10 and 80%. The swelling in this invention is determined by subtracting the dry thickness of the layer before swelling from the swollen thickness of the layer after swelling, wherein the swollen thickness represents the thickness of the layer after immersion in 20° C. distilled water for 3 minutes, and dry thickness represents the thickness of the layer being allowed to stand at 23° C. and 60% RH for more than 24 hours. The thickness of the layer can be determined by various methods. For example, there is a method in which after a sample is immersed in distilled water at a given temperature for a given time to swell the layer, while the swelling process is observed by touching the swollen layer continuously with a needle positioning sensor to measure the thickness of the layer before and after swelling. There is also a method to measure the height of the swollen layer by optical sensor without touching the surface, and subtracting the height of the dry layer to know the swelling amount of the layer. The degree of swelling can be controlled by the types and ratio of monomers, the extent of curing/cross-linking (exposure dose, photo-initiator type and amount) and by other ingredients (e.g. chain transfer agents, synergists).

Surprisingly the membrane due to its swelling character showed higher image densities when used as an ink receiving layer and an improved ozone fastness. Without wishing to be bound by theory, the researchers assume that due to swelling the colorants are incorporated in the polymer network structure and after drying are protected against the influences of ozone and other gasses. In a porous network without swelling capability the colorants can penetrate deep into the layer while by swelling the colorants are thought mainly to be trapped in the surface region of the layer explaining the increased density observed.

A disadvantage of a strongly swelling porous layer is a rather weak scratch resistance. A large swellability is achieved by a low degree of crosslinking which makes the structure of the membrane sensitive to physical disturbance. Surprisingly it was found that a second curing treatment of the dry membrane after drying is completed is more effective for enhancing the robustness than intensifying the curing of the wet coated layer. Again, without wishing to be bound by theory, the inventors suggest that by drying the unreacted curable double bonds are moving closer to each other, thereby increasing the probability of crosslinking upon curing. This second curing step may be done by UV-curing, but also other methods are suitable such as EB-curing or other sources of radiation, e.g. those mentioned hereinabove. In case UV curing is applied for the second curing at least part of the photo-initiator need to remain in reactive form after the first curing step. On the other hand it is important that finally essentially all photo-initiator has reacted because remaining photo-initiator may lead to yellowing of the membrane due to aging which is undesirable for certain applications. This can be easily achieved by tuning the initial concentration of the photo-initiator in the recipe. Alternatively a photo-initiator for the second curing is added separately e.g. by impregnation.

Instead of a second curing of the membrane in the dry state the membrane may be cured while being wet. One way of execution is to perform the second curing shortly after the first curing without intermediate drying step. Another way is to prewet the dried membrane by a liquid that may contain one or more ingredients such as surfactants. An advantage of this procedure is that in the wet state the membrane structure changes upon curing when the membrane is swellable in the liquid applied. So properties as porosity can be modified by performing a second curing step when the membrane is in the swollen state. By this method a wider range of materials and process conditions become suitable since tuning of the structure remains possible after the initial curing step. In between both curing steps an impregnation can be carried out. By impregnation compounds can be brought into the membrane that are not very well compatible with the curable compositions of the first curing step. When the structure of the membrane after the first curing is already good, a second curing is superfluous and just drying after impregnation is sufficient. But when it is desired to fix the compounds brought in by impregnation to the matrix a second curing step is the preferred method of crosslinking. Preferably the membrane is partly dried before an impregnation step is executed. By partial drying the compounds introduced by impregnation e.g. by coating, spraying or dipping, can deeper penetrate into the membrane. By partial drying part of the solvent is removed, e.g. 25% or 50% and in some cases up to 80% of the solvent is removed prior to impregnation. With a good process design more than 2 curing steps will in general not result in improved properties, however certain circumstances such as limited UV intensity may make multiple curing beneficial.

Preferably the exposure dose in the second curing step is between 80 and 300 mJ/m$^2$, more preferably between 100 and 200 mJ/m$^2$ as measured by an High Energy UV Radiometer (UV Power Puck™ from EIT—Instrument Markets) in the UV-B range indicated by the apparatus.

The porous membrane may also comprise one or more non-curable water soluble polymers and/or one or more hydrophilic polymers that are not crosslinked by exposure to radiation. The non-curable water soluble polymer may be added to the curable compound mixture before curing or applied to the cured membrane after curing.

In addition to a non-curable water soluble polymer, up to 20 wt. % crosslinking agent may be added, preferably between 0.5 and 5 wt. %, based on the amount of non-curable water soluble polymer in the layer. Suitable crosslinking agents are described in EP-A-1 437 229. The crosslinking agents can be used alone or in combination.

Preferably the top layer and, if present, the middle layer comprising the porous membrane of the present invention are essentially free from (porous) organic or inorganic particles that are capable of absorbing aqueous solvents. More preferably the porous membrane is essentially free from particles. Essentially free means here that the amount or location of particles is such that there is no significant decrease in gloss or colour density. A quantity of less than 0.1 g/m$^2$ is regarded as essentially free. Preferably all porous layers are essentially free from particles. An exception are matting agents, that are added to prevent handling problems such as blocking, caused by a too smooth surface and which preferably are added in the top layer of the medium in a low amount. Usually less than 0.5% of the total solid content of the porous layer(s) is formed by matting agents.

It may be desirable to add in the toplayer a matting agent (also known as anti-blocking agents) to reduce friction and to prevent image transfer when several printed inkjet media are stacked. Very suitable matting agents have a particle size from 1 to 20 μm, preferably between 2 and 10 μm. The amount of matting agent is from 0.005 to 1 g/m$^2$, preferably from 0.01 to 0.4 g/m$^2$. In most cases an amount of less than 0.1 g/m$^2$ is sufficient. The matting agent can be defined as particles of inorganic or organic materials capable of being dispersed in an aqueous composition. The inorganic matting agents include oxides such as silicon oxide, titanium oxide, magnesium oxide and aluminum oxide, alkali earth metal salts such as barium sulphate, calcium carbonate, and magnesium sulphate, and glass particles. The organic matting agents include starch, cellulose esters such as cellulose acetate propionate, cellulose ethers such as ethyl cellulose, and synthetic resins. The synthetic resins are water insoluble or sparingly soluble polymers which include a polymer of an alkyl(meth)acrylate, an alkoxyalkyl(meth)acrylate, a glycidyl(meth)acrylate, a (meth)acrylamide, a vinyl ester such as vinyl acetate, acrylonitrile, an olefin such as ethylene, or styrene and a copolymer of the above described monomer with other monomers such as acrylic acid, methacrylic acid, alpha, beta-unsaturated dicarboxylic acid, hydroxyalkyl(meth)acrylate, sulfoalkyl(meth)acrylate and styrene sulfonic acid. Further, a benzoguanamin-formaldehyde resin, an epoxy resin, polyamide, polycarbonates, phenol resins, polyvinyl carbazol or polyvinylidene chloride can be used. These matting agents may be used alone or in combination.

Usually the porous membrane has an opaque appearance due to the porous structure of the matrix. Investigations revealed that a higher image density can be obtained when the outer layer or layers are somewhat transparent. This can be achieved by modifying the structure of the outer layer in such a way that the porosity is less. An additional advantage of a less porous toplayer is a better gloss. Because solvent absorption speed is among others dependent on porosity it is preferred that this more transparent toplayer is rather thin. Because the thickness of the more transparent layer usually does not correspond with the thickness of the toplayer as coated it may be more correct to refer to this layer as top region. Most effect of the transparency of the top region on image density is obtained when the colorants are fixed in the upper layers of the membrane, preventing diffusion of the colorant to lower layers. Fixing can be achieved by incorporating into the membrane mordant functionality. For instance a curable mordant can be added to the curable composition or mordants that are non-curable can be added. Mordants are preferably added in the outer layer or layers e.g. in the top layer and/or in the layer just below the toplayer. Preferably the mordants are cationic making them suitable to form complexes with anionic colorants and may be organic or inorganic. The organic and inorganic mordants may be employed alone independently or in combination with each other. A very suitable method to fix the mordants in the outer layer is to introduce negative charges in the outer layer, for instance by applying anionic curable compounds in the curable composition.

A cationic mordant described above is preferably a polymeric mordant having a primary to tertiary amino group or a quaternary ammonium salt as a cationic group; a cationic non-polymeric mordant may also be employed. Such a polymeric mordant is preferably a homopolymer of a monomer (mordant monomer) having a primary to tertiary amino group or a salt thereof, or a quaternary ammonium base, as well as a copolymer or a condensation polymer of such a mordant monomer with other monomers (hereinafter referred to as a non-mordant monomers). Such a polymeric mordant may be in the form either of a water-soluble polymer or a water-dispersible latex particle, e.g. a dispersion of a polyurethane. Suitable mordant monomers are for example alkyl- or benzyl ammonium salts comprising one or more curable groups such as vinyl, (di)allyl, (meth)acrylate, (meth)acrylamide and (meth)acryloyl groups.

A non-mordant monomer as described above is a monomer which does not contain a basic or cationic moiety such as a primary to tertiary amino group or its salt, or quaternary ammonium salt and which exhibits no or substantially slight interaction with a dye contained in the ink jet printing ink. Such a non-mordant monomer may for example be alkyl (meth)acrylates; cycloalkyl (meth)acrylates; aryl (meth)acrylates; aralkyl esters; aromatic vinyls; vinyl esters; allyl esters. Any of the non-mordant monomers listed above may be employed alone or in combination with each other.

An organic mordant is preferably a polyamine or a polyallylamine and its derivatives whose weight mean molecular weight is 100 000 or less. A polyamine or its derivative may be any known amine polymer and its derivative. Such a derivative may for example be a salt of a polyamine with an acid (acid may for example be an inorganic acid such as hydrochloric acid, sulfuric acid, phosphoric acid and nitric acid, an organic acid such as methanesulfonic acid, toluenesulfonic acid, acetic acid, propionic acid, cinnamic acid, (meth)acrylic acid and the like, a combination thereof, or those in which a part of the amine is converted into a salt), a derivative of a polyamine obtained by a polymeric reaction, a copolymer of a polyamine with other copolymerizable monomers (such monomers may for example be (meth)acrylates, styrenes, (meth)acrylamides, acrylonitrile, vinyl esters and the like).

It is also possible to employ an inorganic mordant as a mordant, including a polyvalent water-soluble metal salt or a hydrophobic metal salt compound. An inorganic mordant of the invention is preferably an aluminum-containing compound, titanium-containing compound, zirconium-containing compound, a compound of a metal in the series of Group IIIB in the periodic table (salt or complex). Certain multivalent metal ions are known to be flocculating agents; well known example are aluminum and iron(III) salts such as poly(aluminum chloride) and the sulfates of both ions. These compounds may also be applied as mordants. At high concentrations these compounds may flocculate in the presence of other compounds in aqueous solution but at lower concentrations application as a clear solution is possible.

The amount of mordant is preferably from 0.01 to 5 $g/m^2$, more preferably from 0.1 to 3 $g/m^2$.

If the mordant is a relativity small molecule the mordant or the mordant-colorant complex may diffuse within the layer or to other layers causing reduced sharpness. This problem is also referred to as long term bleeding. A very good method to prevent diffusion of the mordant molecule is to incorporate negative charges into the polymer matrix of the porous membrane. Preferably curable compounds bearing a negative charge are added to the curable composition, preferably to the composition for the layer where the mordant is desired. Examples of these negatively charged curable compounds are ethenically unsaturated compounds having sulfonic or carboxylic or phosphoric acid group, or their metal (or ammonium) salts. Sulfonic acid derivatives are more preferred due to stronger binding with mordants. For example, (meth) acrylic acid-(sulfoalkyl)esters such as sulfopropyl acrylic acid and sulfopropyl methacrylic acid, (meth)acryl-(sulfoalkyl)amides such as 2-acryloylamido-2-methylpropane-1-sulfonic acid, styrenesulfonic acid, itaconic acid-(alkylsulfonic acid)ester, itaconic acid-bis-(alkylsulfonic acid)ester, maleic acid-(alkylsulfonicacid)ester, maleic acid-bis-(alkylsulfonicacid)ester, alkylsulfonic acid allyl ether, mercapto compounds such as mercaptoalkylsulfonic acid, and their metal/ammonium salts. When applied these negatively charged curable compounds are preferably added up to an amount of 30 wt. %, more preferably in an amount between 0.5 and 10 wt. % based on the weight of the curable compounds in the curable composition, most preferably between 1 and 5 wt. %. Better than by wt. % the introduced negative charges are expressed by equivalents since a monomer molecule may contain more than one negatively charged group and the MW of monomers may very significantly. Preferably the porous membrane of the invention comprises up to 10 milli equivalents (meq) per $m^2$ with a minimum of 0.1 meq/$m^2$, more preferably between 0.3 and 5 meq/$m^2$, most preferably between 0.5 and 3 meq/$m^2$. The negatively charged compounds may be added to one composition or to the compositions for more than one layer.

Especially preferred are anionic curable compounds that comprise one or more functional thiol groups. These compounds then act as chain transfer agents which are known to be less sensitive to oxygen inhibition and have a remarkable effect on the structure of the membrane: the porosity is less and the surface becomes smoother. Surprisingly the image density increases when chain transfer agents are applied, even in relatively low amounts. An additional advantage of the use of chain transfer agents is that the tackiness of the surface of the membrane after curing becomes less and the structure becomes more rigid. Examples include mercaptoacetic acid, mercaptopropionic acid, alkyl mercaptopropionate, mercapto-propylsulfonate, ethyldithiocarbonato-S-sulfopropylester, dimercaptopropane sulfonate and mercaptobenzimidazole sulfonate.

Alternatively chain transfer agents that are non-ionic are added in addition to or in stead of the negatively charged curable compounds to obtain similar effects on structure and surface properties. Classes of compounds that comprise suitable substances are mercaptans, polymethacrylates, polyhalo alkanes, benzoquinones, oximes, anthracenes, disulfides, sulfonyl chlorides, sulfoxides, phosphines, alkyl anilines, alkyl amines and metal compounds (such as aluminum, iron, cobalt, copper salts or complexes). Preferred compounds are mercaptoethanol, mercaptoethylether, mercaptobenzimidazole, ethyldithioacetate, butanethiol, dimethyldisulfide, tetrabromomethane, dimethylaniline, ethylenedioxydiethanethiol and triethylamine.

A special class of chain transfer agents are so-called RAFT agents (RAFT=Reversible Addition-Fragmentation chain Transfer). This RAFT reaction is a controlled radical polymerization and generally leads to very narrow molecular weight distributions. Suitable RAFT agents comprise a dithioester group of the formula R1—C(=S)—S—$R_2$, a xanthate group of the formula $R_1$—O—C(=S)—S—$R_2$ or a thioxanthate (trithiocarbonate) group of the formula $R_1$—S—C(=S)—S—$R_2$, a dithiocarbamate group of the formula $R_1$—NR—C(=S)—S—$R_2$ where R, $R_1$ and $R_2$ are selected from an alkyl group, a cycloalkyl group, an aryl group, a heterocyclic group or an arenyl group. Examples are ethyldithioacetate, benzyl dithiobenzoate, cumyl dithiobenzoate, benzyl 1-pyrrolecarbodithioate, cumyl 1-pyrrolecarbodithioate, o-ethyldithiocarbonato-S-(3-sulfopropyl) ester, N,N-dimethyl-5-thiobenzoylthiopropionamide, N,N-dimethyl-S-thiobenzoylthioacetamide, trithiocarbonates and dithiocarbamates.

Chain transfer agents can be characterized by a so-called chain transfer constant which preferably is larger than 0.1, more preferably larger than 1.0. For transfer constants lower than 0.1 no or only very limited effects are achieved. Optimum quantities depend very much on the composition of the curable composition, on the type of the chain transfer agent (reactivity) and on the irradiation dose so the optimum concentration has to be determined case by case. At high levels of chain transfer agents it was found that adhesion problems may occur if the compound is in the layer adjacent to the support. When a multilayer membrane is made the chain transfer agent is preferably in the toplayer where the effect on image density is expected to be the highest. Very high levels may retard the crosslinking reaction too much resulting in a dense non-porous layer or even a layer that is still uncured. Preferably the chain transfer agent is present in an amount between 0.001 and 1.0 mmol/g curable compound. For most compounds the preferred range will be between 0.005 and 0.1 mmol/g curable compound. If the membrane consists of more than one layer the mentioned range apply to the layer or layers comprising the chain transfer agent.

For adequate colorant fixing properties it is important to have a surplus of positive charges that can bind the negatively charged colorant molecules. Preferably the ratio of negative charges present in the anionic curable compounds and positive charges present in the cationic compounds (e.g. mordants) is at least 1:1 and more preferably between 1:2 and 1:10.

Cationic mordants may coagulate with the negatively charged curable compounds If added to the curable composition. Therefore it is generally desirable not to add the mordants to the composition but to apply the mordants to the porous membrane after curing. This may be done by impregnation after partial drying or after complete drying. Impregnation can be performed e.g. by coating or by spraying a solution onto the membrane or by dipping the membrane into a solution. Metering coating such as slide or slot coating is preferred. After drying a porous membrane remains wherein the mordant molecules are trapped at the site where the negative charges are build in into the matrix.

In a preferred embodiment (part of the) cationic mordants are not introduced after curing but are combined with anionic curable compounds in the curable composition. These anionic and cationic compounds form complexes in solution which surprisingly do not precipitate but remain in solution. Those complexes appear to have a better solubility in monomer mixtures that have a limited compatibility with water. This limited compatibility with water makes these monomer mixtures very suitable to initiate phase separation. The single ionic compounds are thought to be more hydrophilic due to their charge than the complexes in which the charges are shielded. Also a combination of both methods (introduction in the curable composition and by impregnation) can be used. When after the membrane is made there is no surplus of positive charges or the surplus is insufficient to fix the dyes at high printing densities additional cationic compounds may be added in a subsequent step, e.g. by impregnation, after the membrane has been formed. So initially in the curable composition the ratio of negative charges present in the anionic curable compounds and positive charges present in the cationic compounds may be larger than 1, e.g. 2:1. Preferably this ratio is reduced in a subsequent step as described above by introducing more cationic charges.

In general mordants are applied to fix the colorants (dyes) from ink. Since at least three colors are used in a colour printer and there exist many brands of ink usually a combination of mordants is required to fix all colorants. Ideally such a mix of mordants is capable of fixing all existing dyes. Alternatively a medium is developed that is dedicated to certain types of ink by which a higher quality may be realized than with a medium suitable for all types of ink.

By impregnation all kinds of additives may be brought into the porous membrane. Preferably these additives are water soluble or may be dispersed or added as an emulsion. To maintain the porous character the total quantity of additives added should be lower than the total pore volume of the membrane, in other words the pores should not be completely filled with additives. The pH of the impregnation solution preferably is comparable to the pH of the porous membrane or if necessary may be adjusted to obtain a clear solution. The impregnation solution may be applied in a wide range of concentrations depending on the type of additives. A suitable concentration is between 1 and 20 wt. %, between 5 and 15 wt. % is more preferred. The impregnation coating may be a single layer, but may also be a multilayer. A multilayer is very suitable to direct one or more compounds to a desired region in the membrane. Compounds such as mordants and optical brighteners are preferably present in the top region of the membrane; by impregnating the membrane by a multilayer wherein these compounds are present in the toplayer these compounds will be located near the surface of the membrane. The toplayer of the impregnation solution is preferably an aqueous solution and may comprise mordants, optical brighteners, surfactants, curable monomers, amine synergists, water soluble polymers, transportability improving/friction reducing agents, UV-absorbers, dye fading prevention agents (radical scavengers, light stabilizers, anti-oxidants), cross-linking agents and conventional additives such as pH regulators, viscosity regulators, biocides, organic solvents. The subsequent second curing fixates the membrane structure through which the final state is obtained.

Also the non-curable water soluble polymer mentioned above can be brought into the porous membrane by impregnation.

Other additives that may be added to one or more of the curable compositions or may be included by impregnation are UV absorbing agents, brightening agents, anti-oxidants, light stabilizing agents, radical scavengers, anti-blurring agents, antistatic agents and/or anionic, cationic, non-ionic, and/or amphoteric surfactants.

Suitable optical brighteners are disclosed in e.g. RD11125, RD9310, RD8727, RD8407, RD36544 and Ullmann's Encyclopedia of industrial chemistry (Vol. A18 p 153-167), and comprise thiophenes, stilbenes, triazines, imidazolones, pyrazolines, triazoles, bis(benzoxazoles), coumarins and acetylenes. Preferred optical brightening agents to be used in the invention are water-soluble and comprise compounds selected from the classes distyrylbenzenes, distyrylbiphenyls, divinylstilbenes, diaminostilbenes, stilbenzyl-2H-triazoles, diphenylpyrazolines, benzimidazoles and benzofurans. In a preferred embodiment the optical brightening agents are cationic and are trapped by negative sites present in the matrix. An effective method of applying these agents is by impregnation as described above. The positively charged optical brightening agents are preferentially trapped in the top region of the porous membrane where they have the most effect. Then lower amounts are sufficient compared with anionic agents that tend to diffuse through the complete layer of the membrane (or all layers in case of a multilayer membrane). Commercially available examples of suitable cationic optical brightening agents are Blankophor™ ACR (Bayer) and Leucophor™ FTS (Clariant).

Whiteness is suitably expressed by the b-value of the CIELAB color model. CIE L*a*b (CIELAB) is a color model used conventionally to describe all the colors visible to the human eye. It was developed for this specific purpose by the International Commission on Illumination (Commission Internationale d'Eclairage, hence the CIE acronym in its name). The three parameters in the model represent the luminance of the color (L, the smallest L represents black), its position between red and green (a, the smallest a represents green) and its position between yellow and blue (b, the smallest b represents blue). For very white membranes low b-values are preferred, values between −5 and −8 indicate a very bright white appearance. Relatively high values (−4 and higher) indicate a more yellowish colour and are less preferred. Membranes with lower values (−8 and lower) tend to be bluish and are generally less preferred. The amount of optical brightening agent is preferably lower than 1 $g/m^2$; more preferably between 0.004 and 0.2 $g/m^2$; most preferably between 0.01 and 0.1 $g/m^2$.

Further the porous membrane may comprise one of more light stabilizing agents such as sterically hindered phenols, sterically hindered amines, and compounds as disclosed in GB2088777, RD 30805, RD 30362 and RD 31980. Especially suitable are water-soluble substituted piperidinium compounds as disclosed in WO-A-02/55618 and compounds such as CGP-520 (Ciba Specialty Chemicals, Switzerland) and Chisorb 582-L (Double Bond Chemical, Taiwan). Other additives may be one or more plasticizers, such as (poly) alkylene glycol, glycerol ethers and polymer lattices with low Tg-value such as polyethylacrylate, polymethylacrylate and the like and one or more conventional additives, such as described for example in EP-A-1 437 229 and EP-A-1 419 984, and in international patent applications WO-A-2005/032832, WO-A-2005/032834 and WO-A-2006/011800 such as acids, biocides, pH controllers, preservatives, viscosity modifiers c.q. stabilizers, dispersing agents, inhibitors, anti-blurring agents, antifoam agents, anti-curling agents, water resistance-imparting agents and the like in accordance with the objects to be achieved.

The above-mentioned additives (UV absorbers, antioxidants, anti-blurring agents, plasticizers, conventional additives) may be selected from those known to a person skilled in the art and may be added in a range of preferably from 0.01 to 10 g/$m^2$. Any of the components mentioned above may be employed alone or in combination with each other. They may be added after being solubilized in water, dispersed, polymer-dispersed, emulsified, converted into oil droplets, or may be encapsulated in microcapsules.

The porous membrane of the invention may be produced by the following steps:

- providing a mixture for the toplayer comprising at least one type of curable compound, at least one type of photo-initiator, and a solvent, wherein the concentration of said curable compound(s) is preferably between 10 and 80 weight percent;
- providing at least one further mixture of at least one type of curable compound, at least one type of photo-initiator, and a solvent, wherein the concentration of said curable compound (s) is preferably between 10 and 80 weight percent and wherein the type of photo-initiator in said at least one further mixture is different from the photo-initiator used in the mixture for the toplayer;
- applying said mixtures to a support, wherein said mixture for the toplayer is allowed to form a layer that is further away from the support than the layer that is formed from said further mixture;
- curing each of said curable compound mixtures, thereby causing phase separation between the crosslinked compound (s) and the solvent;
- optionally subjecting the resulting porous membrane to a washing and/or drying step to remove said solvent; and
- optionally separating the support and the porous membrane.

When high intensity UV light is applied for cross-linking the curable compositions heat is generated by the UV lamp(s). In many systems cooling by air is applied to prevent the lamps from becoming overheated. Still a significant dose of IR light is irradiated together with the UV-beam. In one embodiment the heating-up of the coated support is reduced by placing an IR reflecting quartz plate in between the UV lamp(s) and the coated layer that is guided underneath the lamp(s).

With this technique coating speeds up to 200 m/min or even higher, such as 300 m/min or more, can be reached. To reach the desired dose more than one UV lamp in sequence may be required, so that the coated layer is successively exposed to more than one lamp. When two or more lamps are applied all lamps may give an equal dose or each lamp may have an individual setting. For instance the first lamp may give a higher dose than the second and following lamps or the exposure intensity of the first lamp may be lower. Surprisingly at constant dose the relative intensities appeared to have subtle effects on the photopolymerization reaction which influences the porosity and the structure. By varying the exposure conditions a person skilled in the art can determine optimum settings for the process depending on the properties one wishes to achieve.

Whereas it is possible to practice the invention on a batch basis with a stationary support surface, to gain full advantage of the invention, it is much preferred to practice it on a continuous basis using a moving support surface such as a roll-driven continuous web or belt. Using such apparatus the curable compositions can be made on a continuous basis or it can be made on a large batch basis, and the compositions poured or otherwise applied continuously onto the upstream end of the driven continuous belt support surface, the irradiation source being located above the belt downstream of the composition application station and the membrane removal station being further downstream of the belt, the membrane being removed in the form of a continuous sheet thereof. Removal of the solvent from the membrane can be accomplished either before or after the membrane is taken from the belt. For this embodiment and all others where it is desired to remove the porous membrane from the support surface, it is, of course, preferable that the support surface be such as to facilitate as much as possible the removal of the membrane therefrom. Typical of the support surfaces useful for the practice of such embodiments are smooth, stainless steel sheet or, better yet, teflon or teflon-coated metal sheet. Rather than using a continuous belt, the support surface can be of an expendable material, such as release paper or the like (but not soluble in the solvent), in the form of a roll thereof such that it can be continuously unrolled from the roll, upstream of the solution application station, as a continuous driven length and then rerolled, with the porous membrane thereon, downstream of the radiation station.

It is also within the purview of the invention to form the thin layer of solution as a coating on or intermingled and supported by a porous sheet or fibrous web to which the resulting membrane remains bounded and which can function, for example, as a strengthening reinforcement or backing for the porous membrane. Such porous support surface of which the porous membrane is formed should, of course, be of a material which is insoluble in the solvent used. Typical of the porous support surfaces which can be used for the practice of such embodiments are paper, woven and nonwoven fabric, and the like.

Embodiments are also recognized in which the porous material is not to be separated from a solid support, but in which the two bonded together are the desired final product. Examples of such embodiments are polyester film supported porous membranes which are utilized in electrophoretic separations, membranes attached to a transparent or opaque sheet to be used as recording media for images and the like.

As the support, any of a transparent support composed of a transparent material such as a plastic, and an opaque support composed of an opaque material such as a paper can be used. For most membrane applications the support—if present—must be porous to allow the passing of fluids or gasses. These porous supports can be paper, woven and nonwoven fabric. Examples of nonwoven fabric are materials based on cellulose, polyamide, polyester, polypropylene and the like.

As a material which can be used in the transparent support for recording media, materials which are transparent and have the nature of enduring the radiated heat upon use in Overhead Projection (OHP) and back light display are preferred. Examples of these materials include polyesters such as polyethylene terephthalate (PET), polyethylene naphthalate (PEN), triacetate cellulose (TAC), polysulfone, polyphenylene oxide, polyethylene, polypropylene, polyvinylchloride, polyimide, polycarbonate, polyamide and the like. Other materials that may be used as support are glass, polyacrylate and the like. Inter alia, polyesters are preferable, and polyethylene terephthalate is particularly preferable.

The thickness of the transparent support is not particularly limited, however 50 to 200 μm is preferable from the viewpoint of the handling property.

As an opaque support having high gloss, a support with the surface on which a colorant receiving layer is provided, having a gloss of at least 5%, preferably 15% or larger, is preferable. The gloss is a value obtained according to the method of testing the specular surface gloss of the support at 75° (TAPPI T480).

Embodiments include paper supports having high gloss such as resin coated (RC) paper, baryta paper which are used in art paper, coated paper, cast coated paper, supports as used for silver salt photographic paper and the like; films having high gloss by making opaque plastic films such as polyesters, such as polyethylene terephthalate (PET), cellulose esters such as nitrocellulose, cellulose acetate, cellulose acetate butyrate, polysulfone, polyphenylene oxide, polyimide, polycarbonate, polyamide and the like (which may have the surface subjected to calender treatment) by containing of a white pigment or the like; or supports in which a covering layer of polyolefin containing or not containing a white pigment is provided on the surface of the aforementioned various paper supports, the aforementioned transparent support or films containing a white pigment or the like. An example of a suitable embodiment includes a white pigment-containing expanded polyester film (e.g. expanded PET which contains polyolefin fine particles and in which a void is formed by stretching).

The thickness of the opaque support is not particularly limited, however 50 to 300 μm is preferable from the viewpoint of the handling property.

As already mentioned an important characteristic of a recording medium is the gloss. The gloss is preferably larger than 20% at 200, more preferably larger than 30% as measured by a Dr. Lange Refo 3-D reflectometer. It has been found that the gloss of the medium can be improved by selecting the appropriate surface roughness of the used support. It was found, that providing a support having a surface roughness characterized by the value Ra being less than 1.0 μm, preferably below 0.8 μm a very glossy medium can be obtained. A low value of the Ra indicates a smooth surface. The Ra is measured according to DIN 4776 using a UBM equipment, software package version 1.62, with the following settings:

(1) Point density 500 P/mm, (2) Area 5.6×4.0 $mm^2$, (3) Cut-off wavelength 0.80 mm, (4) Speed 0.5 mm/sec.

In case paper is used as the support for the present invention the paper is selected from materials conventionally used in high quality printing paper. Generally it is based on natural wood pulp and if desired, a filler such as talc, calcium carbonate, $TiO_2$, $BaSO_4$, and the like can be added. Generally the paper also contains internal sizing agents, such as alkyl ketene dimer, higher fatty acids, paraffin wax, alkenylsuccinic acid, such as kymene, epichlorhydrin fatty acid amid and the like. Further the paper may contain wet and dry strength agents such as a polyamine, a poly-amide, polyacrylamide, poly-epichlorohydrin or starch and the like. Further additives in the paper can be fixing agents, such as aluminum sulphate, starch, cationic polymers and the like. The Ra value for a normal grade base paper is usually below 2.0 μm and may typically have values between 1.0 and 1.5 μm. The porous layer of the present invention or layers of which at least one comprises the porous layer of this invention can be directly applied to this base paper.

In order to obtain a base paper with a Ra value below 1.0 μm such a normal grade base paper can be coated with a pigment. Any pigment can be used. Examples of pigments are calcium-carbonate, $TiO_2$, $BaSO_4$, clay, such as kaolin, styrene-acrylic copolymer, Mg—Al-silicate, and the like or combinations thereof. The amount being between 0.5 and 35.0 $g/m^2$ more preferably between 2.0 and 25.0 $g/m^2$. The paper can be coated on one side or on both sides. The amount mentioned before is the amount coated on one side. If both sides are coated the total amount preferably is between 4.0 and 50 $g/m^2$. This pigmented coating can be applied as a pigment slurry in water together with suitable binders like styrene-butadiene latex, styrene-acrylate latex, methyl methacrylate-butadiene latex, polyvinyl alcohol, modified starch, polyacrylate latex or combinations thereof, by any technique known in the art, like dip coating, roll coating, blade coating, bar coating, size press or film press. The pigment coated base paper may optionally be calendered. The surface roughness can be influenced by the kind of pigment used and by a combination of pigment and calendering. The base pigment coated paper substrate has preferably a surface roughness between 0.4 and 0.8 μm. If the surface roughness is further reduced by super calendering to values below 0.4 μm the thickness and stiffness values will in general become rather low.

The porous layer or layers of which at least one comprises the porous layer of this invention, can be directly applied to the pigment coated base paper.

In another embodiment, the pigment coated base paper having a pigmented top side and a back-side is provided on at least the topside with a polymer resin through high temperature co-extrusion giving a laminated pigment coated base paper. Typically temperatures in this (co-) extrusion method are above 280° C. but below 350° C. The preferred polymers used are poly olefins, particularly polyethylene. In a preferred embodiment the polymer resin of the top side comprises compounds such as an opacifying white pigment e.g. $TiO_2$ (anatase or rutile), ZnO or ZnS, dyes, colored pigments, including blueing agents, e.g. ultramarine or cobalt blue, adhesion promoters, optical brighteners, antioxidant and the like to improve the whiteness of the laminated pigment coated base paper. By using other than white pigments a variety of colors of the laminated pigment coated base paper can be obtained. The total weight of the laminated pigment coated base paper is preferably between 80 and 350 $g/m^2$. The laminated pigment coated base paper shows a very good smoothness, which after applying the porous layer or layers comprising the porous layer or layers of the present invention results in a recording medium with excellent gloss.

On the other hand, depending on the product one wants to make a polyethylene-coated paper can be used with a matt surface or silky surface such as is well known in the art. Such a surface is obtained by conducting an embossing treatment upon extruding a polyethylene on a paper substrate.

As is evident from the description given above, the recording media comprising the porous layer of this invention can be a single layer or a multi-layer applied onto a support. It can also comprise layers, which are non porous and are located below the porous layer.

The media including the inventive porous layer or layers, can be coated in one single step or in successive steps as long as the preferred pore sizes, and porosity is obtained.

As a coating method, any method can be used. For example, curtain coating, extrusion coating, air-knife coating, slide coating, roll coating method, reverse roll coating, dip coating, rod bar coating. This coating can be done simultaneously or consecutively, depending on the embodiments used. In order to produce a sufficiently flowable composition for use in a high speed coating machine, it is preferred that the viscosity does not exceed 4000 mPa·s at 25° C., more preferably that it should not exceed 1,000 mPa·s at 25° C.

Before applying the coating to the surface of the support material described above this support may be subjected to a corona discharge treatment, glow discharge treatment, flame treatment, ultraviolet light irradiation treatment and the like, for the purpose of improving the wettability and the adhesiveness.

When used as recording media the membranes of the present invention can be used for a multitude of recording applications so it is within the scope of the present invention to provide recording media that are suitable for creating high quality images by using techniques as for example Giclée printing, color copying, screen printing, gravure, dye-sublimation, flexography, ink jet and the like.

Except for application in (inkjet) recording media, the porous membranes find use in a variety of other applications, such as in membranes for water treatment, in the chemical and petrochemical industry, for ultra filtration processes in the electrocoating of paint, in the food industry such as in the production process of cheese, clarification of fruit juice and in the beer production, in the pharmaceutical industry where a high resistivity membrane for organic solvents is required, and in the biotechnology industry especially where flux reduction due to fouling by protein needs to be avoided. The membrane can be made suitable for nanofiltration or reversed osmosis by selecting appropriate ingredients and process conditions. The hydrophilic character of the porous membrane according to this invention may result in a significant reduction of the fouling rate of the membrane and makes it suitable for all kind of other application where conventional micro- and ultra filtration is applied.

The present invention will be illustrated in more detail by the following non-limiting examples. Unless stated otherwise, all given ratios and amounts are based on weight.

EXAMPLES

The following coating solutions were prepared at room temperature with constant stirring.

A three layer concept was applied, wherein a bottom (BL), middle (ML) and toplayer (TL) were applied to a support.

For the bottom layer:

| Material | BL Recipe A | BL Recipe B | BL Recipe C | BL Recipe D | units |
|---|---|---|---|---|---|
| CN-132 | 217.3 | 217.3 | 217.3 | 217.3 | gram |
| Water | 467.9 | 471.7 | 471.7 | 464.7 | gram |
| Isopropanol | 108.7 | 108.7 | 108.7 | 108.7 | gram |
| CN-435 | 144.9 | 144.9 | 144.9 | 144.9 | gram |
| AAMPSA | 9.7 | 9.7 | 9.7 | 9.7 | gram |
| 1 N NaOH | 45.7 | 45.7 | 45.7 | 45.7 | gram |
| Irgacure ™ 2959 | 5.8 | | | 8.9 | gram |
| Esacure ™ KIP100F | | 2.0 | | | gram |
| IGM TPO-L | | | 2.0 | | gram |

For the middle layer:

| Material | ML Recipe A | ML Recipe B | ML Recipe C | ML Recipe D | Units |
|---|---|---|---|---|---|
| CN-132 | 217.3 | 217.3 | 217.3 | 217.3 | Gram |
| Water | 467.9 | 471.7 | 471.7 | 471.7 | Gram |
| Isopropanol | 108.7 | 108.7 | 108.7 | 108.7 | Gram |
| CN-435 | 144.9 | 144.9 | 144.9 | 144.9 | Gram |
| AAMPSA | 9.7 | 9.7 | 9.7 | 9.7 | Gram |
| 1 N NaOH | 45.7 | 45.7 | 45.7 | 45.7 | Gram |
| Irgacure ™ 2959 | 5.8 | | | 2.9 | Gram |
| Esacure ™ KIP100F | | 2.0 | | | Gram |
| IGM TPO-L | | | 2.0 | | Gram |

For the top layer:

| Material | TL Recipe A | TL Recipe B | TL Recipe C | TL Recipe D | Units |
|---|---|---|---|---|---|
| CN-132 | 217.3 | 217.3 | 217.3 | 217.3 | Gram |
| Water | 360.8 | 364.7 | 365.2 | 363.8 | Gram |
| Isopropanol | 81.5 | 81.5 | 81.5 | 81.5 | Gram |
| CN-435 | 144.9 | 144.9 | 144.9 | 144.9 | Gram |
| GMA-gelatin | 41.9 | 41.9 | 41.9 | 41.9 | Gram |
| AAMPSA | 9.7 | 9.7 | 9.7 | 9.7 | Gram |
| Zonyl ™ FSN 3% | 70.7 | 70.7 | 70.7 | 70.7 | Gram |
| PA10 - GMA-gelatin | 24.6 | 24.6 | 24.6 | 24.6 | Gram |
| 1 N NaOH | 36.9 | 36.9 | 36.9 | 36.9 | Gram |
| Irgacure ™ 2959 | 5.8 | | | 2.9 | Gram |
| Esacure ™ KIP100F | | 2.0 | | | Gram |
| IGM TPO-L | | | 1.5 | | Gram |

CN-132 is an acrylate monomer supplied by Cray Valley.
CN-435 is an acrylate monomer supplied by Cray Valley.
GMA-gelatin is a 22% aqueous solution of GMA-modified gelatin in a weight ratio of 1:10. GMA is glycidylmethacrylate supplied by Sigma Aldrich. The gelatin used is an hydrolyzed acid pigskin gelatin (7-8 kDa) (HAPG).
AAMPSA is 2-acryloylamido-2-methyl-propanesulfonic acid monomer supplied by Sigma Aldrich.
Irgacure ™ 2959 is a photo-initiator supplied by Ciba Specialty Chemicals.
Esacure ™ KIP100F is a photo-initiator supplied by Lamberti, Spa.
IGM TPO-L is a photo-initiator supplied by IGM Resins.
Zonyl ™ FSN is a fluoro-surfactant supplied by DuPont.

PA10 is a 10% dispersion of Orgasol 2001™ polyamide beads with an average size of 10 μm, supplied by Arkema, in a 13 wt % solution of GMA modified gelatin (weight ratio of GMA:gelatin is 1:10).

As a support a photographic grade paper having polyethylene laminated at both sides was used.

The following combinations were applied to the support.

| Example | Recipe BL | Recipe ML | Recipe TL |
|---|---|---|---|
| 1 | A | A | A |
| 2 | B | B | B |
| 3 | C | C | C |
| 4 | D | A | D |
| 5 | B | D | D |
| 6 | C | D | D |

These solutions were coated in a single step via a slide coating machine with a coating speed of 24 m/min in an amount of 40, 15 and 5 cc/m$^2$ for the bottom layer, middle layer and toplayer respectively.

1.2 seconds after coating UV curing was applied using a Light Hammer™ 6 lamp of Fusion UV Systems Inc., placed in-focus, with a lamp intensity of 60%. After this process, the cured samples were dried for 3 minutes at 40° C., 8% RH.

After drying and storage, several samples were additionally cured by the UV Fusion bench top model with 100% lamp intensity at a coating speed of 30 m/min.

Gloss

The gloss is quantified by measurements at 20° using the REFO 3-D Reflektometer™ supplied by Dr. Lange. The reported values are averages of 2 independent measurements.

Smearing Test (Drying Speed)

| | |
|---|---|
| Equipment: | P325 printer: (paper: HP photo Paper, print quality: best) |
| Ink: | HP344 (HP Vivera ink, black) |
| Image: | Line pattern, 6 × 0.8 mm line, 20 cc/m$^2$ |

-continued

| | |
|---|---|
| Friction by: | Rubber eraser (from a pencil supplied by Conté, France) |
| Weight: | 30 gram |
| Sample size: | 10 × 15 cm |

A print image of high density black lines was made on each sample. These lines were printed with an interval of 4 seconds. After the last line was printed, the sheet was fed out of the printer immediately. On the outside of the printer, the eraser was positioned so that it touched the sheet during the transportation out of the interior of the printer. The weight of the eraser was 30 g. The lines are printed after 0, 4, 8, 12, 16, and 20 seconds respectively. Between the time the last line is printed and the moment the eraser touches the printed lines about 0.5 seconds passes. This method ensured that the lines passed the fixed eraser after 0.5, 4.5, 8.5, 12.5, 16.5, and 20.5 seconds respectively, after printing. If the lines were still found to be wet, smearing of the black line occurred which could be judged by visual inspection.

Results

| Example | PI in bottom layer (conc) | PI in middle layer (conc) | PI in top layer (conc) | gloss (%) | smearing (seconds) |
|---|---|---|---|---|---|
| 1 | Irgacure2959 (0.6%) | Irgacure2959 (0.6%) | Irgacure2959 (0.6%) | 36 | <12 |
| 2 | KIP100F (0.2%) | KIP100F (0.2%) | KIP100F (0.2%) | 10 | <4 |
| 3 | TPO-L (0.2%) | TPO-L (0.2%) | TPO-L (0.2%) | 5 | <0.5 |
| 4 | Irgacure2959 (0.9%) | Irgacure2959 (0.6%) | Irgacure2959 (0.3%) | 41 | <16 |
| 5 | KIP100F (0.2%) | Irgacure2959 (0.3%) | Irgacure2959 (0.3%) | 33 | <0.5 |
| 6 | TPO-L (0.2%) | Irgacure2959 (0.3%) | Irgacure2959 (0.3%) | 30 | <0.5 |

PI = Photo initiator

Examples 1, 4, 5 and 6 with Irgacure™ 2959 in the toplayer and middle layer showed a very good gloss, while examples 2 and 3 with KIP100F or TPO-L in top- and middle layer are not very glossy. On the other hand the samples with KIP100F or TPO-L in the bottom layer have a good ink absorption as expressed in the smearing test. The examples 5 and 6 where the two types of photo-initiator are combined have both a good gloss and a good ink absorption speed.

The invention claimed is:

1. A porous membrane, comprising multiple layers, and prior to curing at least one type of curable compound and at least two types of photo-initiator, wherein at least two layers each contain a different photo-initiator.

2. The membrane according to claim 1 wherein each of said photo-initiators is selected from the group consisting of an alpha-hydroxyalkylphenone, an alpha-aminoalkylphenone, an alpha-sulfonylalkylphenone, an acyiphosphine oxide and combinations thereof.

3. The membrane according to claim 1 wherein said membrane is essentially free from inorganic or organic particles that are capable of absorbing aqueous solvents.

4. The membrane according to claim 1 wherein said curable compound is an ethylenically unsaturated compound.

5. The membrane according to claim 1 wherein said curable compound comprises one or more acrylate groups or methacrylate groups.

6. The membrane according to claim 1 wherein the weight ratio of said photo-initiator and said curable compound or compounds in the curable coating compositions is between 0.005 and 0.05.

7. The membrane according to claim 1 wherein said membrane is formed by curing by UV radiation.

8. The membrane according to claim 1 wherein said membrane comprises a polyether modified polysiloxane derivative.

9. A process for obtaining a porous membrane according to claim 1:

providing a mixture for the toplayer comprising at least one type of curable compound, at least one type of photo-initiator, and a solvent, wherein the concentration of said curable compound(s) is preferably between 10 and 80 weight percent;

providing at least one further mixture of at least one type of curable compound, at least one type of photo-initiator, and a solvent, wherein the concentration of said curable compound (s) is preferably between 10 and 80 weight percent and wherein the type of photo-initiator is different from the photo-initiator used in the mixture for the toplayer;

applying said mixtures to a support, wherein said mixture for the toplayer is allowed to form a layer that is further away from the support than the layer that is formed from said further mixture;

curing each of said curable compound mixtures, thereby causing phase separation between the crosslinked compound (s) and the solvent;

optionally subjecting the resulting porous membrane to a washing and/or drying step to remove said solvent; and optionally separating the support and the porous membrane.

10. A recording medium comprising a support and the porous membrane according to claim 1 as receiving layer adhered to said support.

11. The medium according to claim 10 wherein said support is a transparent support suitable for back-lit applications and is selected from the group consisting of polyethylene terephthalate (PET), polyethylene naphthalate (PEN), polysulfone, polyphenylene oxide, polyimide, polycarbonate and polyamide.

12. The medium according to claim 10, wherein said support is a reflective support and is selected from the group consisting of a paper support, a plastic film and a support in which a covering layer of polyolefin optionally containing a white pigment is provided.

13. The medium according to claim 1, wherein said curable compound is selected from epoxy compounds, oxetane derivatives, lactone derivatives, oxazoline derivatives, cyclic siloxanes, or ethenically unsaturated compound such as acrylates, methacrylates, polyene-polythiols, vinylethers, vinylamides, vinylamines, allyl ethers, allylesters, allylamines, maleic acid derivatives, itacoic acid derivatives, polybutadienes and styrenes.

14. Use of a medium according to claim 10 for printing images or characters thereon, using Giclée printing, colour copying, screen printing, gravure, dye-sublimation, flexography, and/or ink jet printing.

* * * * *

UNITED STATES PATENT AND TRADEMARK OFFICE

CERTIFICATE OF CORRECTION

PATENT NO. : 7,704,573 B2
APPLICATION NO. : 12/020937
DATED : April 27, 2010
INVENTOR(S) : Yujiro Itami et al.

It is certified that error appears in the above-identified patent and that said Letters Patent is hereby corrected as shown below:

TITLE PAGE IN THE FOREIGN APPLICATION PRIORITY DATA (item 30)

Change the number "05076825" to --05076835--

IN THE ABSTRACT (item 57)

In the fourth line, change "contain a the different" to --contain a different--

IN THE DETAILED DESCRIPTION

Column 3 Line 63: change "propertied" to --properties--

Column 5 Line 23: after "preferably less than" insert --5--

Column 5 Line 61: change "unsaturated compound" to --unsaturated compounds--

Column 9 Line 34: change "pentaoxamidecyl" to --pentaoxatridecyl--

Column 11 Line 32: change "3-(fluoro-C6-$C_{11}$" to --3-(fluoro-$C_6$-$C_{11}$--

Column 11 Line 53: change "U.S. Pat. No. 6,084,340" to --US Pat. No. 5,084,340--

Column 13 Line 67: delete the word "while"

Column 17 Line 16: change "known example are" to --known examples are--

Column 17 Line 35: change "phosphoric acid group" to --phosphoric acid groups--

Column 18 Line 27: change "R1-C(=S)-S-$R_2$" to --$R_1$-C(=S)-S-$R_2$--

Column 19 Line 2: change "compounds If added" to --compounds if added--

Column 19 Line 12: change "build" to --built--

Column 20 Line 57: change "one of more" to --one or more--

IN THE CLAIMS

Claim 2: change "acyiphosphine" to --acylphosphine--

Signed and Sealed this
Fifth Day of July, 2011

David J. Kappos
*Director of the United States Patent and Trademark Office*

UNITED STATES PATENT AND TRADEMARK OFFICE

CERTIFICATE OF CORRECTION

PATENT NO. : 7,704,573 B2
APPLICATION NO. : 12/020937
DATED : April 27, 2010
INVENTOR(S) : Yujiro Itami et al.

It is certified that error appears in the above-identified patent and that said Letters Patent is hereby corrected as shown below:

TITLE PAGE IN THE FOREIGN APPLICATION PRIORITY DATA (item 30)

Change the number "05076825" to --05076835--

IN THE ABSTRACT (item 57)

In the fourth line, change "contain a the different" to --contain a different--

IN THE DETAILED DESCRIPTION

Column 3 Line 63: change "propertied" to --properties--

Column 5 Line 23: after "preferably less than" insert --5--

Column 5 Line 61: change "unsaturated compound" to --unsaturated compounds--

Column 9 Line 34: change "pentaoxamidecyl" to --pentaoxatridecyl--

Column 11 Line 32: change "3-(fluoro-C6-$C_{11}$" to --3-(fluoro-$C_6$-$C_{11}$--

Column 11 Line 53: change "U.S. Pat. No. 6,084,340" to --US Pat. No. 5,084,340--

Column 13 Line 67: delete the word "while"

Column 17 Line 16: change "known example are" to --known examples are--

Column 17 Line 35: change "phosphoric acid group" to --phosphoric acid groups--

Column 18 Line 27: change "R1-C(=S)-S-$R_2$" to --$R_1$-C(=S)-S-$R_2$--

Column 19 Line 2: change "compounds If added" to --compounds if added--

Column 19 Line 12: change "build" to --built--

Column 20 Line 57: change "one of more" to --one or more--

IN THE CLAIMS

Column 27, line 55 (claim 2, line 4): change "acyiphosphine" to --acylphosphine--

This certificate supersedes the Certificate of Correction issued July 5, 2011.

Signed and Sealed this
Sixteenth Day of August, 2011

David J. Kappos
*Director of the United States Patent and Trademark Office*